US011313309B2

(12) United States Patent
Hashimoto et al.

(10) Patent No.: US 11,313,309 B2
(45) Date of Patent: *Apr. 26, 2022

(54) VEHICLE CONTROL DEVICE, VEHICLE CONTROL SYSTEM, AND METHOD FOR CONTROLLING VEHICLE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,862

(22) Filed: Oct. 9, 2020

(65) Prior Publication Data

US 2021/0115871 A1   Apr. 22, 2021

(30) Foreign Application Priority Data

Oct. 18, 2019 (JP) .............................. JP2019-191097

(51) Int. Cl.
| | |
|---|---|
| *B60T 1/00* | (2006.01) |
| *F02D 41/24* | (2006.01) |
| *F02D 41/00* | (2006.01) |
| *F02D 41/28* | (2006.01) |
| *G06V 40/16* | (2022.01) |

(52) U.S. Cl.
CPC ..... *F02D 41/2464* (2013.01); *F02D 41/0002* (2013.01); *F02D 41/28* (2013.01);
(Continued)

(58) Field of Classification Search
CPC ........ F02D 41/00; F02D 41/009; F02D 41/14; F02D 41/1405; F02D 41/1454;
(Continued)

(56) References Cited

U.S. PATENT DOCUMENTS

| | | | |
|---|---|---|---|
| 5,410,477 | A | 4/1995 | Ishii et al. |
| 6,549,815 | B1 | 4/2003 | Kaji |

(Continued)

FOREIGN PATENT DOCUMENTS

| | | |
|---|---|---|
| JP | 4-293626 A | 10/1992 |
| JP | 10-254505 A | 9/1998 |

(Continued)

*Primary Examiner* — John Kwon
(74) *Attorney, Agent, or Firm* — Oblon, McClelland, Maier & Neustadt, L.L.P.

(57) ABSTRACT

A vehicle control device includes a memory configured to store relationship definition data that defines a relationship between a state of a vehicle and an action variable, which is a variable relating to an operation of electronic equipment in the vehicle, and a processor. The processor is configured to execute acquisition processing of acquiring a detection value of a sensor and driving preference information, operation processing of operating the electronic equipment, reward calculation processing of providing a greater reward when a characteristic of the vehicle satisfies a criterion than when the characteristic of the vehicle does not satisfy the criterion, and update processing of updating the relationship definition data. The processor is configured to, based on update mapping, output the relationship definition data updated to increase an expected return on the reward when the electronic equipment is operated in compliance with the relationship definition data.

20 Claims, 7 Drawing Sheets

(52) U.S. Cl.
CPC ...... *G06V 40/166* (2022.01); *F02D 2041/285* (2013.01); *F02D 2200/602* (2013.01)

(58) Field of Classification Search
CPC .. F02D 41/1479; F02D 41/1498; F02D 41/24; F02D 41/2406; F02D 41/2429; F02D 41/2454; F02D 41/2461; F02D 41/34; F02D 2200/101; F02D 2200/102; F02D 2200/50; B60W 10/06; B60W 10/08; B60W 10/30; B60W 20/15; B60K 6/22; B60K 17/04; B60K 20/15; F16H 63/50
See application file for complete search history.

(56) References Cited

U.S. PATENT DOCUMENTS

| | | |
|---|---|---|
| 2012/0117011 A1 | 5/2012 | Hashimoto et al. |
| 2020/0263581 A1 | 8/2020 | Muto et al. |
| 2020/0263618 A1 | 8/2020 | Muto et al. |
| 2021/0033039 A1* | 2/2021 | Hashimoto ......... F02D 41/2454 |
| 2021/0056781 A1* | 2/2021 | Hashimoto .......... G07C 5/0841 |
| 2021/0114581 A1* | 4/2021 | Hashimoto .......... G06K 9/6262 |
| 2021/0114596 A1* | 4/2021 | Hashimoto ........... B60W 10/06 |
| 2021/0114608 A1* | 4/2021 | Hashimoto ......... F02D 41/2464 |
| 2021/0115870 A1 | 4/2021 | Hashimoto et al. |
| 2021/0115871 A1* | 4/2021 | Hashimoto ......... F02D 41/0002 |

FOREIGN PATENT DOCUMENTS

| | | |
|---|---|---|
| JP | 2000-250604 A | 9/2000 |
| JP | 2016-6327 A | 1/2016 |
| JP | 2019-519851 A | 7/2019 |
| JP | 6547991 | 7/2019 |
| JP | 2019-144748 A | 8/2019 |
| JP | 6590097 | 10/2019 |
| WO | 2018/084324 A1 | 5/2018 |

* cited by examiner

VEHICLE CONTROL DEVICE, VEHICLE CONTROL SYSTEM, AND METHOD FOR CONTROLLING VEHICLE

INCORPORATION BY REFERENCE

The disclosure of Japanese Patent Application No. 2019-191097 filed on Oct. 18, 2019 including the specification, drawings and abstract is incorporated herein by reference in its entirety.

BACKGROUND

1. Technical Field

The present disclosure relates to a vehicle control device, a vehicle control system, and a method for controlling a vehicle.

2. Description of Related Art

For example, Japanese Unexamined Patent Application Publication No. 2016-6327 (JP 2016-6327 A) describes a control device that operates a throttle valve as an operating unit of an internal combustion engine mounted in a vehicle based on a value obtained through filter processing on an operation amount of an accelerator pedal.

SUMMARY

Incidentally, since the filter needs to set an opening degree of the throttle valve of the internal combustion engine mounted in the vehicle to an appropriate opening degree according to the operation amount of the accelerator pedal, there is a need for an expert to apply many man-hours for adaptation. In this way, an expert has applied many man-hours for adaptation of an operation amount or the like of electronic equipment in a vehicle according to a state of the vehicle.

A first aspect of the present disclosure relates to a vehicle control device. The vehicle control device includes a memory and a processor. The memory is configured to store relationship definition data that defines a relationship between a state of the vehicle and an action variable, which is a variable relating to an operation of electronic equipment in the vehicle. The processor is configured to execute acquisition processing of acquiring a detection value of a sensor and driving preference information, which is information relating to a driving preference of a user. The sensor is configured to detect the state of the vehicle. The processor is configured to execute operation processing of operating the electronic equipment based on a value of the action variable determined by the detection value acquired through the acquisition processing and the relationship definition data. The processor is configured to execute reward calculation processing of providing, based on the detection value acquired through the acquisition processing, a greater reward when a characteristic of the vehicle satisfies a criterion than when the characteristic of the vehicle does not satisfy the criterion. The reward calculation processing is processing of providing a different reward when the driving preference information is different even though a characteristic relating to a behavior of the vehicle satisfies the same criterion. The processor is configured to execute update processing of updating the relationship definition data with the state of the vehicle based on the detection value acquired through the acquisition processing, the value of the action variable used for the operation of the electronic equipment, and the reward corresponding to the operation as inputs to update mapping determined in advance. The processor is configured to, based on the update mapping, output the relationship definition data updated to increase an expected return on the reward when the electronic equipment is operated in compliance with the relationship definition data.

According to the first aspect, the reward accompanied by the operation of the electronic equipment is calculated, whereby it is possible to ascertain what kind of reward is obtained by the operation. Then, the relationship definition data is updated based on the reward through update mapping compliant with reinforcement learning, whereby it is possible to set the relationship between the state of the vehicle and the action variable to an appropriate relationship in traveling of the vehicle. Accordingly, in setting the relationship between the state of the vehicle and the action variable to an appropriate relationship in traveling of the vehicle, it is possible to reduce man-hours requested to an expert.

Incidentally, when the reward is determined definitively, there is a possibility that the relationship between the state of the vehicle and the action variable learned through reinforcement learning does not follow a driving preference of the user. Accordingly, according to the above-described first aspect, the driving preference information is acquired, and the reward is provided based on the driving preference information through the reward calculation processing, whereby it is possible to update the relationship definition data to follow the driving preference of the user through reinforcement learning.

In the first aspect, the acquisition processing may include processing of acquiring a user's evaluation of the behavior of the vehicle as the driving preference information. The reward calculation processing may include processing of providing a reward different from a reward before the acquisition of the evaluation when the driving preference information indicating that the evaluation is low is acquired through the acquisition processing even though the characteristic relating to the behavior of the vehicle is the same.

According to the above-described first aspect, the user's evaluation is acquired as the driving preference information, and when the evaluation result is low, the reward is changed. Then, the operation processing is executed using the relationship definition data updated through the subsequent update processing, whereby it is possible to improve a user's evaluation.

In the first aspect, the driving preference information may include history information of an acceleration in a front-rear direction of the vehicle. Since a history of the acceleration in the front-rear direction of the vehicle is different depending on how the user operates an accelerator, the driving preference of the user is reflected in the history of the acceleration. In view of this point, according to the above-described first aspect, the history of the acceleration is acquired as the driving preference information, whereby it is possible to acquire the driving preference information even through the user does not input the driving preference information.

In the first aspect, the driving preference information may include history information of an accelerator operation amount. Since the accelerator operation of the user is different according to the driving preference of the user, the driving preference information is included in the history information of the accelerator operation amount. In view of this point, according to the above-described first aspect, the history of the accelerator operation amount is acquired as the driving preference information, whereby it is possible to acquire the driving preference information even though the user does not input the driving preference information.

In the first aspect, the acquisition processing may include processing of acquiring an analysis of a face image of the user as the driving preference information. According to the above-described first aspect, the analysis result of the face image of the user is acquired as the driving preference information, whereby it is possible to acquire the driving preference information even through the user does not input the driving preference information.

In the first aspect, the state of the vehicle may include a change in accelerator operation amount. The reward calculation processing may include processing of providing a greater reward when an acceleration in a front-rear direction of the vehicle accompanied by the change in accelerator operation amount satisfies a criterion than when the acceleration does not satisfy the criterion.

Since the magnitude of the acceleration in the front-rear direction of the vehicle resulting from the change in accelerator operation amount is significantly concerned with the traveling performance of the vehicle, as in the above-described first aspect, the reward according to whether or not the acceleration satisfies the criterion is provided, whereby it is possible to learn a value of an appropriate action variable through reinforcement learning in securing desired traveling performance according to the state of the vehicle.

In particular, according to the above-described first aspect, since a way of providing a reward is changed according to the driving preference information, whereby it is possible to learn a value of an appropriate action variable through reinforcement learning in securing appropriate traveling performance for the driving preference.

The vehicle may include an internal combustion engine as a thrust generation device of the vehicle. A throttle valve of the internal combustion engine may be included in the electronic equipment. In the first aspect, a variable relating to an opening degree of the throttle valve may be included in the action variable.

For example, in an internal combustion engine in which an injection amount is adjusted according to an intake air amount, or the like, torque or an output of the internal combustion engine is changed according to the opening degree of the throttle valve. For this reason, the variable relating to the opening degree of the throttle valve is used as the action variable for the accelerator operation amount, whereby it is possible to suitably adjust propulsion force of the vehicle.

A second aspect of the present disclosure relates to a vehicle control system. The vehicle control system includes a memory and a processor. The memory is configured to store relationship definition data that defines a relationship between a state of the vehicle and an action variable, which is a variable relating to an operation of electronic equipment in the vehicle. The processor includes a first processor mounted in the vehicle and a second processor different from an in-vehicle device. The first processor is configured to execute at least acquisition processing and operation processing. The acquisition processing is processing of acquiring a detection value of a sensor configured to detect the state of the vehicle and driving preference information, which is information relating to a driving preference of a user. The operation processing is processing of operating the electronic equipment based on a value of the action variable determined by the detection value acquired through the acquisition processing and the relationship definition data. The second processor is configured to execute at least update processing. The update processing is processing of updating the relationship definition data with the state of the vehicle based on the detection value acquired through the acquisition processing, the value of the action variable used for the operation of the electronic equipment, and a reward corresponding to the operation as inputs to update mapping determined in advance.

According to the above-described second aspect, the update processing is executed by the second processor, whereby it is possible to reduce a calculation load of the first processor compared to when the first processor executes the update processing. The second processor being different from the in-vehicle device means that the second processor is not the in-vehicle device.

A third aspect of the present disclosure relates to a method for controlling a vehicle. The vehicle includes a memory and a processor. The memory is configured to store relationship definition data that defines a relationship between a state of a vehicle and an action variable, which is a variable relating to an operation of electronic equipment in the vehicle. The method includes: executing, by the processor, acquisition processing of acquiring a detection value of a sensor and driving preference information, which is information relating to a driving preference of a user, the sensor being configured to detect the state of the vehicle; executing, by the processor, operation processing of operating the electronic equipment based on a value of the action variable determined by the detection value acquired through the acquisition processing and the relationship definition data; executing, by the processor, reward calculation processing of providing, based on the detection value acquired through the acquisition processing, a greater reward when a characteristic of the vehicle satisfies a criterion than when the characteristic of the vehicle does not satisfy the criterion, the reward calculation processing being processing of providing a different reward when the driving preference information is different even though a characteristic relating to a behavior of the vehicle satisfies the same criterion; executing, by the processor, update processing of updating the relationship definition data with the state of the vehicle based on the detection value acquired through the acquisition processing, the value of the action variable used for the operation of the electronic equipment, and the reward corresponding to the operation as inputs to update mapping determined in advance; and outputting, by the processor, based on the update mapping, the relationship definition data updated to increase an expected return on the reward when the electronic equipment is operated in compliance with the relationship definition data.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
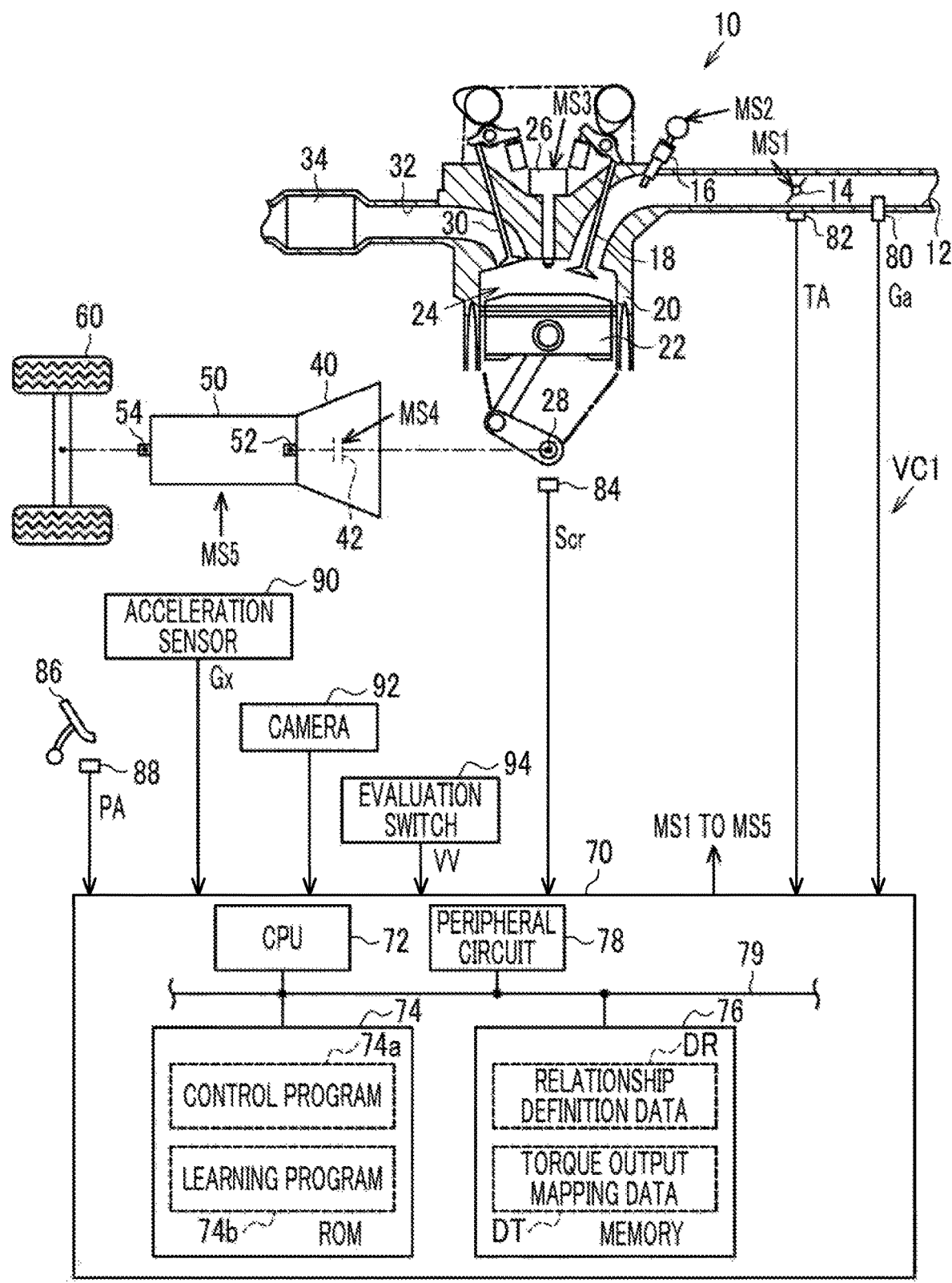
FIG. 1 is a diagram showing a control device and a drive system according to a first embodiment.

Hereinafter, a first embodiment of a vehicle control device will be described referring to the drawings. FIG. 1 shows the configuration of a drive system and a control device of a vehicle VC1 according to the embodiment.

As shown in FIG. 1, in an intake passage 12 of an internal combustion engine 10, a throttle valve 14 and a fuel injection valve 16 are provided in order from an upstream side, and air sucked into the intake passage 12 or fuel injected from the fuel injection valve 16 flows into a combustion chamber 24 partitioned by a cylinder 20 and a piston 22 when an intake valve 18 is opened. In the combustion chamber 24, an air-fuel mixture of fuel and air is supplied for combustion with spark discharge of an ignition device 26, and energy generated by combustion is converted into rotational energy of a crankshaft 28 through the piston 22. The air-fuel mixture supplied for combustion is discharged as exhaust gas to an exhaust passage 32 when an exhaust valve 30 is opened. In the exhaust passage 32, a catalyst 34 as a post-processing device that cleans exhaust gas.

An input shaft 52 of a transmission 50 is mechanically coupled to the crankshaft 28 through a torque converter 40 including a lockup clutch 42. The transmission 50 is a device that varies a gear ratio as a ratio of a rotation speed of the input shaft 52 and a rotation speed of an output shaft 54. Drive wheels 60 are mechanically coupled to the output shaft 54.

A control device 70 adapts the internal combustion engine 10 as a control target and operates an operating unit of the internal combustion engine 10, such as the throttle valve 14, the fuel injection valve 16, or the ignition device 26, to control torque, an exhaust gas component ratio, or the like that is a control amount of the internal combustion engine. The control device 70 also adapts the torque converter 40 as a control target and operates the lockup clutch 42 to control an engagement state of the lockup clutch 42. The control device 70 also adapts the transmission 50 as a control target and operates the transmission 50 to control the gear ratio as a control amount of the transmission. In FIG. 1, respective operation signals MS1 to MS5 of the throttle valve 14, the fuel injection valve 16, the ignition device 26, the lockup clutch 42, and the transmission 50 are described.

The control device 70 refers to an intake air amount Ga detected by an air flowmeter 80, an opening degree (throttle valve opening degree TA) of the throttle valve 14 detected by a throttle sensor 82, and an output signal Scr of a crank angle sensor 84 to control the control amount. The control device 70 also refers to a depression amount (accelerator operation amount PA) of an accelerator pedal 86 detected by an accelerator sensor 88, an acceleration Gx in a front-rear direction of the vehicle VC1 detected by an acceleration sensor 90, a face image of a user captured by a camera 92, and a value of an evaluation variable VV determined by an operation of an evaluation switch 94. Here, the evaluation switch 94 is a human-machine interface that allows the user of the vehicle VC1 to select one of three options relating to traveling performance of the vehicle VC1. Here, the three options are three stages of "too high", "just right", and "too low" in terms of responsiveness.

The control device 70 includes a CPU 72, a ROM 74, an electrically rewritable nonvolatile memory (memory 76), and a peripheral circuit 78, and the units are communicable through a local network 79. Here, the peripheral circuit 78 includes a circuit that generates a clock signal for defining an internal operation, a power supply circuit, a reset circuit, and the like.

The ROM 74 stores a control program 74a and a learning program 74b. On the other hand, the memory 76 stores relationship definition data DR that defines a relationship between the accelerator operation amount PA, and a command value (throttle valve opening degree command value TA*) of the throttle valve opening degree TA and a retardation amount aop of the ignition device 26. Here, the retardation amount aop is a retardation amount with respect to a reference ignition timing determined in advance, and the reference ignition timing is a timing on a retardation side out of an MBT ignition timing and a knock limit point. The MBT ignition timing is an ignition timing (maximum torque ignition timing) at which maximum torque is obtained. The knock limit point is an advancement limit value of an ignition timing at which knocking can be restrained within an allowable level under assumed best conditions when high-octane-number fuel having a high knock limit is used. The memory 76 stores torque output mapping data DT. Torque output mapping defined by the torque output mapping data DT is mapping for outputting torque Trq with a rotation speed NE of the crankshaft 28, filling efficiency η, and an ignition timing aig as inputs.

Figure 2:
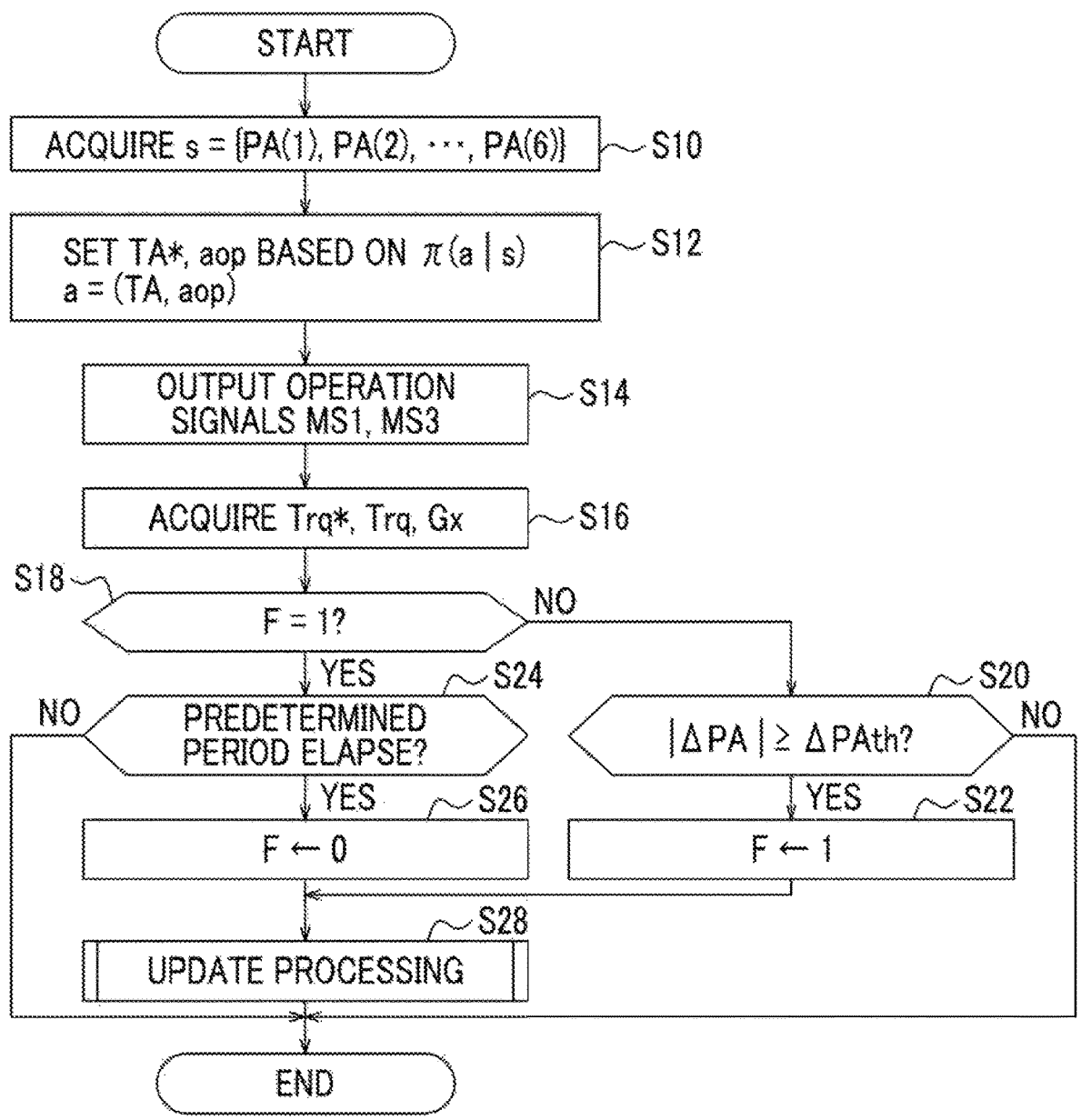
FIG. 2 is a flowchart showing a procedure of processing that is executed by the control device according to the embodiment.

FIG. 2 shows a procedure of processing that is executed by the control device 70 according to the embodiment. The processing shown in FIG. 2 is implemented by the CPU 72 repeatedly executing the control program 74a and the learning program 74b stored in the ROM 74, for example, in a predetermined cycle. In the following description, the step number of the respective processing is represented by a number in front of which the character "S" is given.

In a series of processing shown in FIG. 2, the CPU 72 first acquires time-series data including six sampling values "PA(1), PA(2), . . . , PA(6)" of the accelerator operation amount PA as a state s (S10). Here, the sampling values constituting time-series data are sampled at different timings from one another. In the embodiment, time-series data is constituted of six sampling values adjacent to one another in time series when sampling is performed in a given sampling cycle.

Next, the CPU 72 sets an action a including the throttle valve opening degree command value TA* and the retardation amount aop according to the state s acquired through the processing of S10 in compliance with a policy π determined by the relationship definition data DR (S12).

In the embodiment, the relationship definition data DR is data that determines an action value function Q and the policy π. In the embodiment, the action value function Q is a function in a table format indicating a value of an expected return according to eight-dimensional independent variables of the state s and the action a. The policy π determines a rule to select an action a (greedy action) maximizing the action value function Q with the independent variable to be the given state s with priority and also to select another action a with a predetermined probability c when the state s is given.

In detail, in regard to the number of possible values of the independent variables of the action value function Q according to the embodiment, a part of all combinations of possible values of the state s and the action a is reduced by human knowledge or the like. That is, for example, determination is made that a situation in which one of adjacent two sampling values in the time-series data of the accelerator operation amount PA becomes a minimum value of the accelerator operation amount PA and the other sampling value becomes a maximum value does not result from a human operation on the accelerator pedal 86, and the action value function Q is not defined. In the embodiment, with the dimension reduction based on the human knowledge or the like, the possible values of the state s defining the action value function Q are limited to be equal to or less than the fourth power of 10, and more desirably, equal to or less than the third power of 10.

Next, the CPU 72 outputs the operation signal MS1 to the throttle valve 14 to operate the throttle valve opening degree TA and outputs the operation signal MS3 to the ignition device 26 to operate the ignition timing based on the set throttle valve opening degree command value TA* and retardation amount aop (S14). Here, in the embodiment, since feedback control of the throttle valve opening degree TA to the throttle valve opening degree command value TA* is illustrated, even though the throttle valve opening degree command value TA* is the same value, the operation signal MS1 may be different. For example, when known knocking control (KCS) or the like is performed, the ignition timing becomes a value resulting from feedback correction by the KCS on a value obtained by retarding the reference ignition timing by the retardation amount aop. Here, the reference ignition timing is η by the CPU 72. The rotation speed NE is calculated based on the output signal Scr of the crank angle sensor 84 by the CPU 72. The filling efficiency η is calculated based on the rotation speed NE and the intake air amount Ga by the CPU 72.

Next, the CPU 72 acquires the torque Trq of the internal combustion engine 10, a torque command value Trq* to the internal combustion engine 10, and the acceleration Gx (S16). Here, the CPU 72 calculates the torque Trq by inputting the rotation speed NE, the filling efficiency η, and the ignition timing to torque output mapping. The CPU 72 sets the torque command value Trq* according to the accelerator operation amount PA.

Next, the CPU 72 determines whether or not a transition flag F is "1" (S18). When the transition flag F is "1", this indicates that the internal combustion engine is in a transition operation, and when the transition flag F is "0", this indicates that the internal combustion engine is not in the transition operation. When determination is made that the transition flag F is "0" (S18: NO), the CPU 72 determines whether or not an absolute value of a change amount ΔPA per unit time of the accelerator operation amount PA is equal to or greater than a predetermined amount ΔPAth (S20). Here, the change amount ΔPA should be set to, for example, the difference between the latest accelerator operation amount PA at an execution timing of the processing of S20 and the accelerator operation amount PA before the same timing by the unit time.

When determination is made that the absolute value of the change amount ΔPA is equal to or greater than the predetermined amount ΔPAth (S20: YES), the CPU 72 substitutes "1" into the transition flag F (S22). In contrast, when determination is made that the transition flag F is "1" (S18: YES), the CPU 72 determines whether or not a predetermined period has elapsed after the execution of the processing of S22 (S24). Here, the predetermined period is set to a period until a state in which the absolute value of the change amount ΔPA per unit time of the accelerator operation amount PA becomes equal to or less than a specified amount smaller than the predetermined amount ΔPAth is continued for a predetermined time. When determination is made that the predetermined period has elapsed (S24: YES), the CPU 72 substitutes "0" into the transition flag F (S26).

Figure 3:
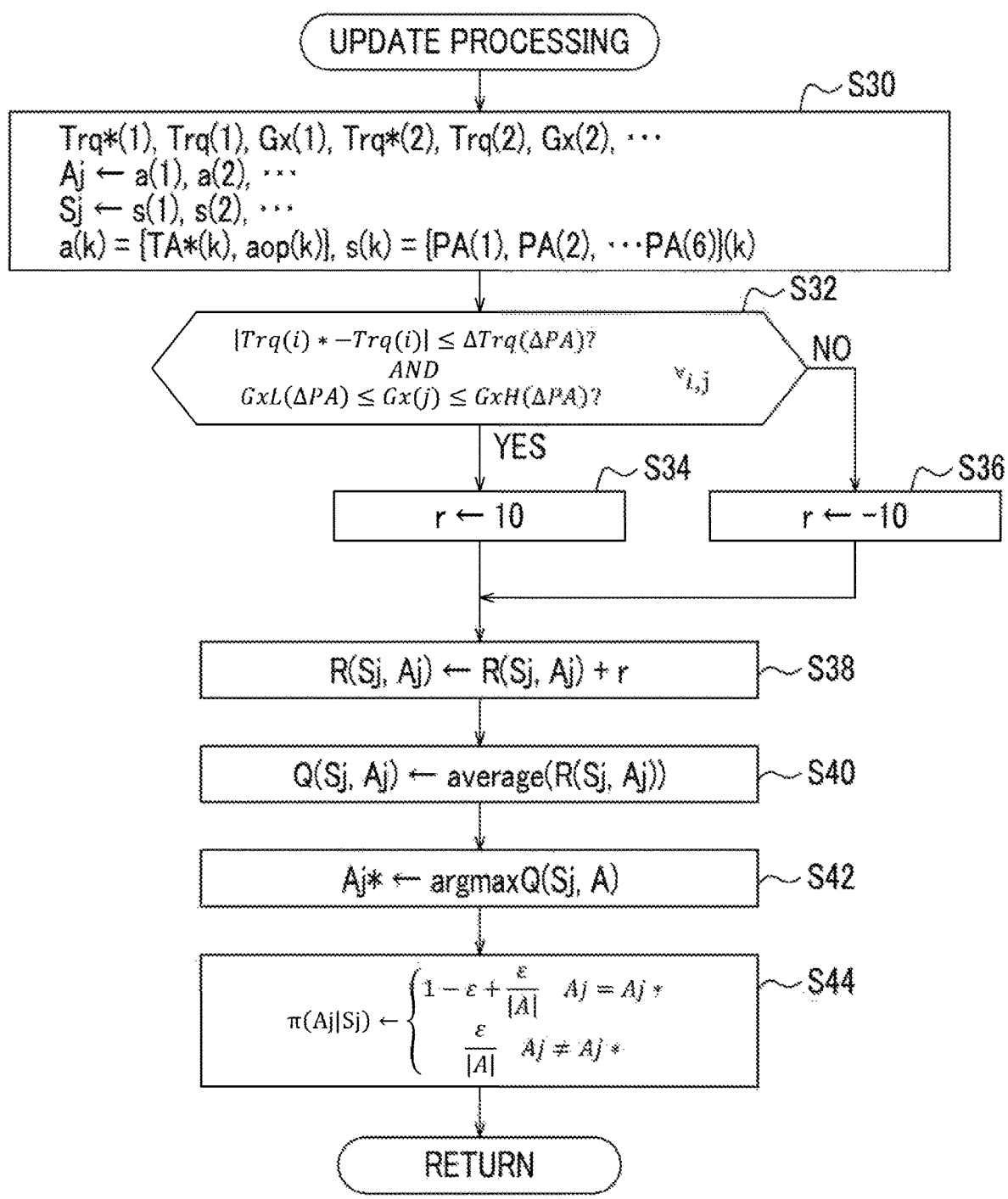
FIG. 3 is a flowchart showing a detailed procedure of processing that is executed by the control device according to the embodiment.

When the processing of S22 or S26 is completed, the CPU 72 determines that one episode is ended, and updates the action value function Q through reinforcement learning (S28). FIG. 3 shows the details of the processing of S28.

In a series of processing shown in FIG. 3, CPU 72 acquires time-series data including a set of three sampling values of the torque command value Trq*, the torque Trq, and the acceleration Gx in the last ended episode and time-series data of the state s and the action a (S30). Here, the last episode is a period during which the transition flag F is continuously "0" when the processing of S30 is executed next to the processing of S22, and is a period during which the transition flag F is continuously "1" when the processing of S30 is executed next to the processing of S26.

FIG. 3 shows that different numbers in parentheses are values of variables at different sampling timings. For example, a torque command value Trq*(1) and a torque command value Trq*(2) are different in sampling timing from each other. Time-series data of the action a belonging to the last episode is defined as an action set Aj, and time-series data of the state s belonging to the same episode is defined as a state set Sj.

Next, the CPU 72 determines whether or not a logical product of a condition (i) that an absolute value of the difference between any torque Trq and the torque command value Trq* belonging to the last episode is equal to or less than a specified amount ΔTrq and a condition (ii) that the acceleration Gx is equal to or greater than a lower limit value GxL and equal to or less than an upper limit value GxH is true (S32).

Here, the CPU 72 variably sets the specified amount ΔTrq with the change amount ΔPA per unit time of the accelerator operation amount PA at the time of a start of an episode. That is, when ΔPA per unit time of the accelerator operation amount PA at the time of a start of an episode, the CPU 72 sets the specified amount ΔTrq to a greater value than an episode in a normal period.

The CPU 72 variably sets the lower limit value GxL with the change amount ΔPA of the accelerator operation amount PA at the time of the start of the episode. That is, when the episode relates to the transition period and the change amount ΔPA is positive, the CPU 72 sets the lower limit value GxL to a greater value than the episode in the normal period. When the episode relates to the transition period and the change amount ΔPA is negative, the CPU 72 sets the lower limit value GxL to a smaller value than the episode in the normal period.

The CPU 72 variably sets the upper limit value GxH with the change amount ΔPA per unit time of the accelerator operation amount PA at the time of the start of the episode. That is, when the episode relates to the transition period and the change amountΔPA is positive, the CPU 72 sets the upper limit value GxH to a greater value than the episode in the normal period. When the episode relates to the transition period and the change amount ΔPA is negative, the CPU 72 sets the upper limit value GxH to a smaller value than the episode in the normal period.

When determination is made that the logical product is true (S32: YES), the CPU 72 substitutes "10" into a reward r (S34), and when determination is made that the logical product is false (S32: NO), the CPU 72 substitutes "−10"

into the reward r (S36). When the processing of S34 or S36 is completed, the CPU 72 updates the relationship definition data DR stored in the memory 76 shown in FIG. 1. In the embodiment, an ε-soft on-policy type Monte Carlo method is used.

That is, the CPU 72 adds the reward r to each return R(Sj,Aj) determined by a set of each state read through the processing of S30 and a corresponding action (S38). Here, "R(Sj,Aj)" comprehensively represents a return R with one of the elements of the state set Sj as a state and one of the elements of the action set Aj as an action. Next, the return R(Sj,Aj) determined by the set of each state read through the processing of S30 and the corresponding action is averaged, and the averaged reward is substituted into the corresponding action value function Q(Sj,Aj) (S40). Here, averaging should be processing of dividing the return R calculated through the processing of S38 by a value obtained by adding a predetermined number to the number of times in which the processing of S38 is executed. An initial value of the return R should be an initial value of the corresponding action value function Q.

Next, the CPU 72 substitutes, into an action Aj*, an action that is a set of the throttle valve opening degree command value TA* and the retardation amount aop when the corresponding action value function Q(Sj,A) has a maximum value on each state read through the processing of S30 (S42). Here, "A" indicates any possible action. Although the action Aj* becomes an individual value according to the type of the state read through the processing of S30, here, the action Aj* is simplified in expression and described by the same symbol.

Next, the CPU 72 updates a corresponding policy π(Aj|Sj) on each state read through the processing of S30 (S44). That is, when the total number of actions is "|A|", a selection probability of the action Aj* selected through S42 is "1−ε+ ε/|A|". A selection probability of each of "|A|−1" actions other than the action Aj* is "ε/|A|". Since the processing of S44 is processing based on the action value function Q updated through the processing of S40, with this, the relationship definition data DR that defines the relationship between the state s and the action a is updated so as to increase the return R.

When the processing of S44 is completed, the CPU 72 ends a series of processing shown in FIG. 3 once. Returning to FIG. 2, when the processing of S28 is completed or when negative determination is made in the processing of S20 or S24, the CPU 72 ends a series of processing shown in FIG. 2 once. The processing of S10 to S26 is implemented by the CPU 72 executing the control program 74a, and the processing of S28 is implemented by the CPU 72 executing the learning program 74b. The relationship definition data DR at the time of shipment of the vehicle VC1 is data that is learned in advance through the same processing as the processing shown in FIG. 2 while a simulation of traveling of the vehicle is performed by a test bench or the like.

Figure 4:
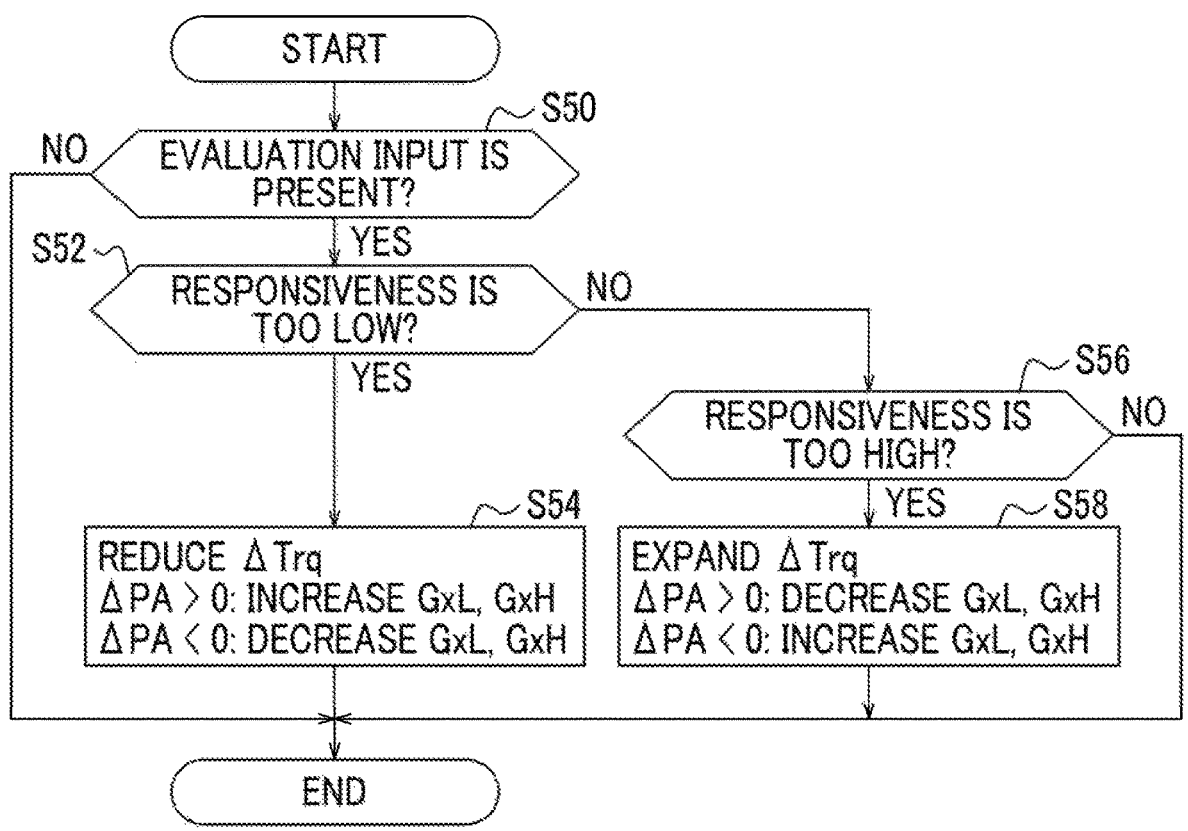
FIG. 4 is a flowchart showing a procedure of processing that is executed by the control device according to the embodiment.

FIG. 4 shows a procedure of processing of changing a criterion in the processing of S32. The processing shown in FIG. 4 is implemented by the CPU 72 repeatedly executing the learning program 74b stored in the ROM 74, for example, in a predetermined cycle.

In a series of processing shown in FIG. 4, the CPU 72 first determines whether or not an evaluation input by an operation of the evaluation switch 94 is present (S50). Then, when determination is made that the evaluation input is present (S50: YES), the CPU 72 determines whether or not the evaluation input is an input to the effect that "responsiveness is too low" (S52). Then, when determination is made that the evaluation input is the input to the effect "responsiveness is too low" is present (S52: YES), in the transition period, the CPU 72 reduces the specified amount ΔTrq, increases the upper limit value GxH and the lower limit value GxL when the change amount LPA is positive, and decreases the upper limit value GxH and the lower limit value GxL when the change amount ΔPA is negative (S54).

In contrast, when negative determination is made in the processing of S52, the CPU 72 determines whether or not the evaluation input is an input to the effect that "responsiveness is too high" (S56). Then, when determination is made that the evaluation input is the input to the effect that "responsiveness is too high" (S56: YES), in the transition period, the CPU 72 expands the specified amount ΔTrq, decreases the upper limit value GxH and the lower limit value GxL when the change amountΔPA is positive, and increases the upper limit value GxH and the lower limit value GxL when the change amount ΔPA is negative (S58).

When the processing of S54 or S58 is completed or when negative determination is made in the processing of S50 or S56, the CPU 72 ends a series of processing shown in FIG. 4 once. Here, the operation and the effects of the embodiment will be described.

The CPU 72 acquires the time-series data of the accelerator operation amount PA according to a user's operation on the accelerator pedal 86 and sets the action a including the throttle valve opening degree command value TA* and the retardation amount aop in compliance with the policy π. Here, the CPU 72 basically selects the action a maximizing the expected return based on the action value function Q defined in the relationship definition data DR. Note that the CPU 72 explores the action a maximizing the expected return by selecting an action other than the action a maximizing the expected return with the predetermined probability ε. With this, the relationship definition data DR can be updated through reinforcement learning with user's driving of the vehicle VC1. With this, the throttle valve opening degree command value TA* and the retardation amount aop according to the accelerator operation amount PA can be set to appropriate values in traveling of the vehicle VC1 while man-hours of the expert are not excessively increased.

In particular, in the embodiment, the user can evaluate the traveling performance of the vehicle by operating the evaluation switch 94. Then, a criterion relating to the absolute value of the difference between the torque Trq and the torque command value Trq* or a criterion relating to the acceleration Gx in providing the reward r is changed according to a user's evaluation result. With this, the criterion relating to the absolute value of the difference between the torque Trq and the torque command value Trq* or the criterion relating to the acceleration Gx can be made appropriate for the driving preference of the user. Accordingly, as reinforcement learning progresses with driving of the user, the relationship definition data DR can be updated to data appropriate for the driving preference of the user.

According to the embodiment described above, the following advantageous effects are further obtained. (1) The time-series data of the accelerator operation amount PA is included in the independent variable of the action value function Q. With this, the value of the action a can be finely adjusted for various changes in accelerator operation amount PA compared to when solely a single sampling value related to the accelerator operation amount PA is used as an independent variable.

(2) The throttle valve opening degree command value TA* itself is included in the independent variable of the action value function Q. With this, for example, the degree of freedom of exploration through reinforcement learning is easily increased compared to when a parameter or the like of a model expression modeling the behavior of the throttle valve opening degree command value TA* is used as an independent variable relating to the throttle valve opening degree.

Second Embodiment

Hereinafter, a second embodiment will be described referring to the drawings focusing on differences from the first embodiment.

Figure 5:
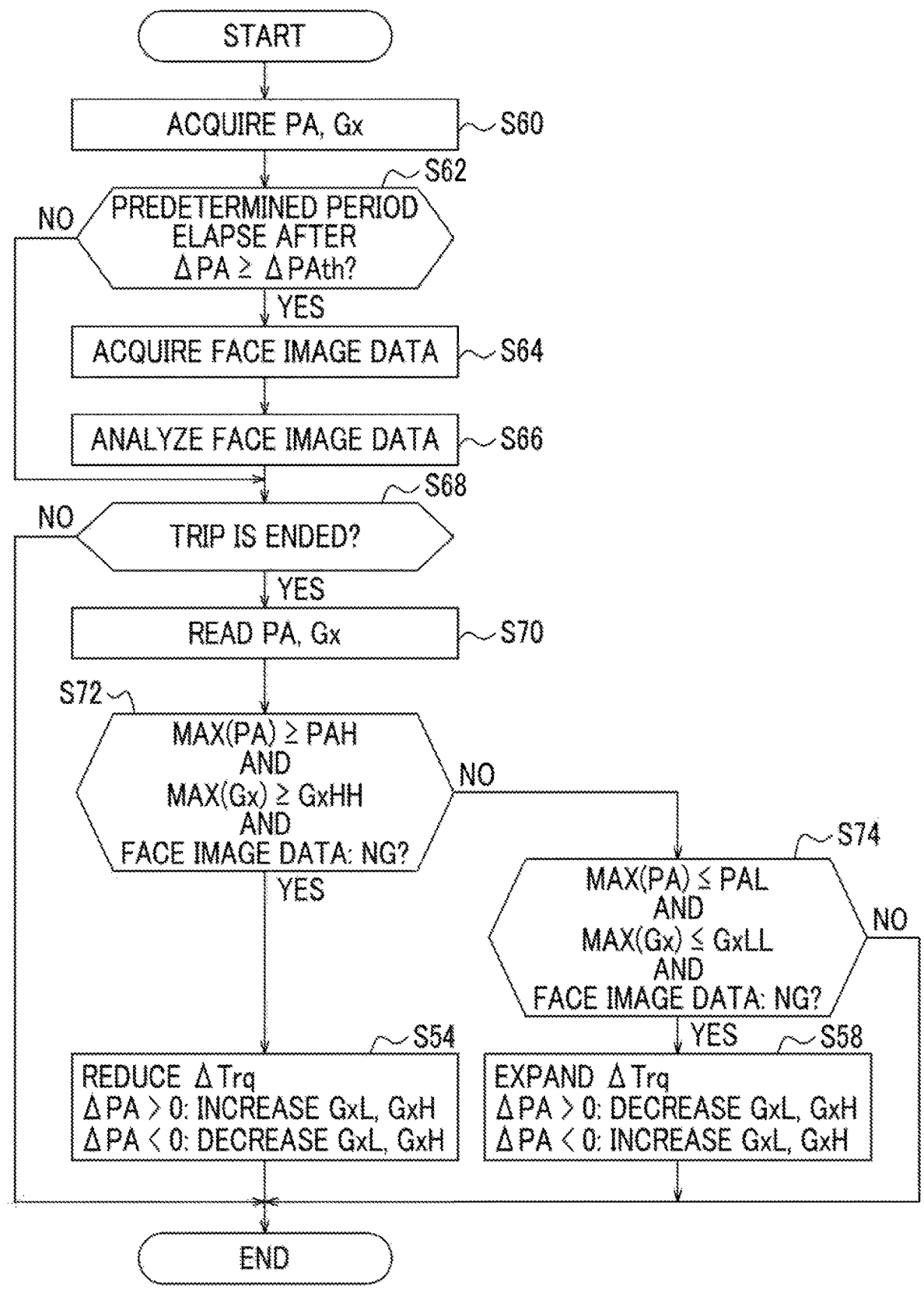
FIG. 5 is a flowchart showing a procedure of processing that is executed by a control device according to a second embodiment.

FIG. 5 shows a procedure of processing of changing the criterion in the processing of S32 according to the embodiment. The processing shown in FIG. 5 is implemented by the CPU 72 repeatedly executing the learning program 74b stored in the ROM 74, for example, in a predetermined cycle. In FIG. 5, processing corresponding to the processing shown in FIG. 4 is represented by the same step numbers for convenience.

In a series of processing shown in FIG. 5, the CPU 72 first acquires the accelerator operation amount PA and the acceleration Gx (S60). Next, the CPU 72 determines whether or not a predetermined period has elapsed after the change amount ΔPA per unit time of the accelerator operation amount PA becomes equal to or greater than the predetermined amount ΔPAth (S62). Here, the predetermined period is set to a period until a predetermined time elapses after the change amount ΔPA per unit time of the accelerator operation amount PA becomes small.

When determination is made that the predetermined period has elapsed (S62: YES), the CPU 72 acquires face image data (S64). Then, the CPU 72 determines whether or not the user feels discomfort with driving performance by analyzing the face image data, and stores a result of the determination in the memory 76 (S66). When the processing of S66 is completed or when negative determination is made in the processing of S62, the CPU 72 determines whether or not a trip is ended (S68). Here, the trip is a single period during which a traveling permission signal of a vehicle is in an on state. In the embodiment, the traveling permission signal corresponds to an ignition signal.

When determination is made that the trip is ended (S68: YES), the CPU 72 reads the time-series data of the accelerator operation amount PA and the acceleration Gx acquired through the processing of S60 in the trip (S70). Then, the CPU 72 determines whether or not a logical product of the following conditions (iii) to (v) is true (S72).

Condition (iii): Condition that a maximum value of the accelerator operation amount PA is equal to or greater than a specified value PAH. Here, the specified value PAH is set to a value greater than an assumed maximum value of the accelerator operation amount PA resulting from a general user's operation of the accelerator pedal 86.

Condition (iv): Condition that a maximum value of the acceleration Gx of the vehicle VC1 is equal to or greater than a specified value GxHH. Here, the specified value GxHH is set to a value greater than an assumed maximum value of the acceleration Gx resulting from a general user's operation of the accelerator pedal 86.

Condition (v): Condition that an analysis result of face image data through the processing of S66 shows discomfort with driving performance. When determination is made that the logical product of the conditions (iii) to (v) is true (S72: YES), the CPU 72 executes the processing of S54. That is, when the logical product of the conditions (iii) and (iv) is true, there is a possibility that the user is about to strongly depress the accelerator pedal 86 to suddenly accelerate the vehicle VC1, and when the condition (v) is established, there is a possibility that the user strongly depresses accelerator pedal 86 since the use has dissatisfied with the responsiveness of the vehicle VC1 compared to a general user. Accordingly, a condition for providing a reward is changed such that the acceleration performance of the vehicle VC1 can be improved.

In contrast, when determination is made that the logical product of the conditions (iii) to (v) is false (S72: NO), the CPU 72 determines whether or not a logical product of the following conditions (vi), (vii), and (v) is true (S74).

Condition (vi): Condition that the maximum value of the accelerator operation amount PA is equal to or less than a specified value PAL. Here, the specified value PAL is set to a value smaller than an assumed maximum value of the accelerator operation amount PA resulting from a general user's operation of the accelerator pedal 86.

Condition (vii): Condition that the maximum value of the acceleration Gx of the vehicle VC1 is equal to or less than a specified value GxLL. Here, the specified value GxLL is set to a value smaller than an assumed maximum value of the acceleration Gx resulting from a general user's operation of the accelerator pedal 86.

When determination is made that the logical product of the conditions (vi), (vii), and (v) is true (S74: YES), the CPU 72 executes the processing of S58. That is, when the logical product of the conditions (vi) and (vii) is true, the user of the vehicle VC1 tends to lightly depress the accelerator pedal 86 compared to the general user, and when the condition (v) is established, nevertheless, there is a possibility that the acceleration applied to the vehicle VC1 is too large to give discomfort to the user. Accordingly, the condition for providing the reward is changed such that an acceleration that the use feels at the time of acceleration of the vehicle VC1 can be made smaller.

When the processing of S54 or S58 is completed or when negative determination is made in the processing of S68 or S74, the CPU 72 ends a series of processing shown in FIG. 5 once. In this way, in the embodiment, while the user does not perform an operation to input an evaluation of traveling performance, the driving preference information can be acquired from information during user's driving of the vehicle VC1, and the condition for providing the reward can be changed accordingly.

Third Embodiment

Hereinafter, a third embodiment will be described referring to the drawing focusing on differences from the first embodiment.

Figure 6:
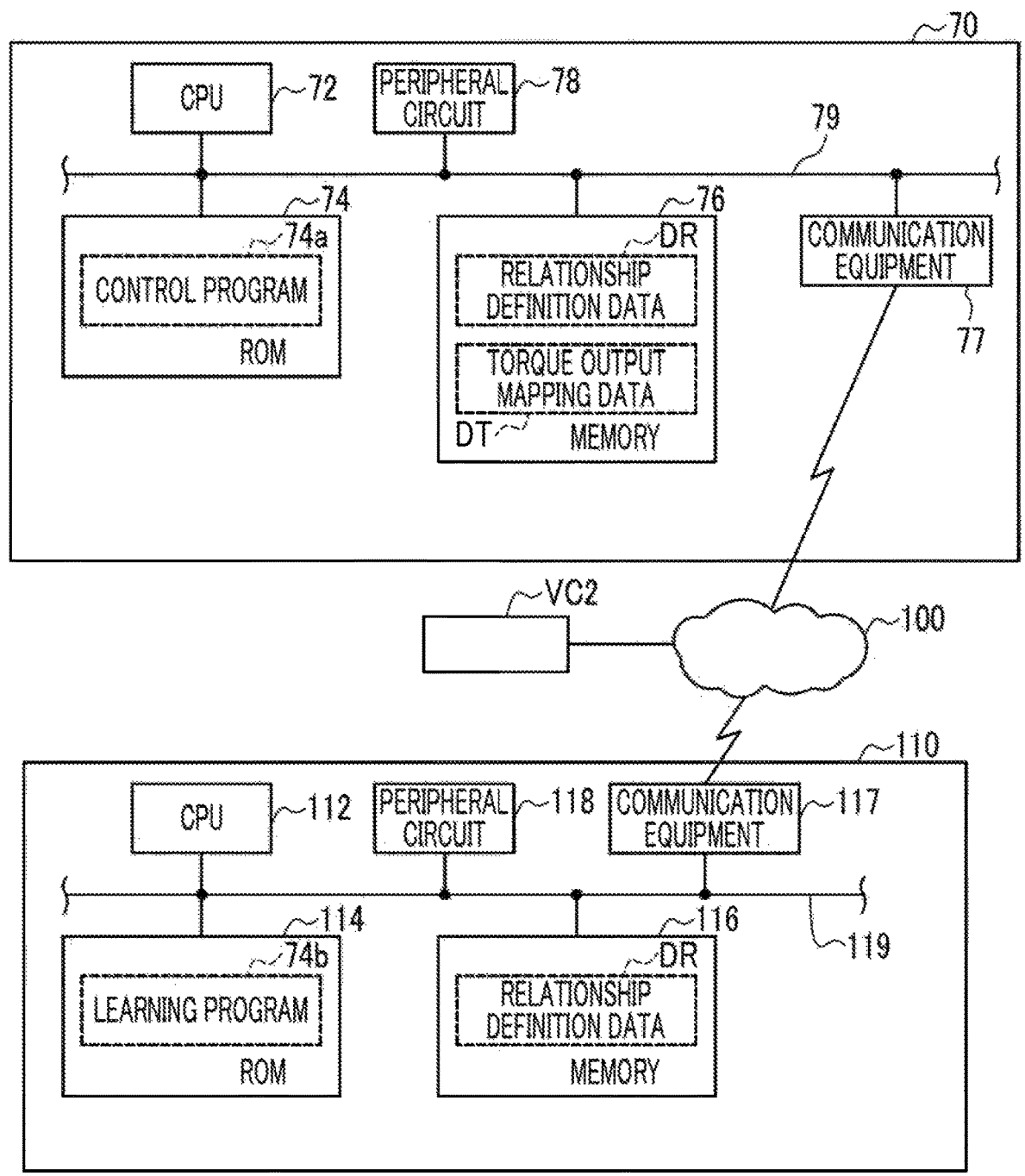
FIG. 6 is a diagram showing the configuration of a control system according to a third embodiment.

In the embodiment, the relationship definition data DR is updated outside the vehicle VC1. FIG. 6 shows the configuration of a control system that executes reinforcement learning in the embodiment. In FIG. 6, members corresponding to the members shown in FIG. 1 are represented by the same reference numerals for convenience.

The ROM 74 in the control device 70 in the vehicle VC1 shown in FIG. 6 stores the control program 74a, but does not store the learning program 74b. The control device 70 includes communication equipment 77. The communication equipment 77 is equipment for communication with a data analysis center 110 through an external network 100 of the vehicle VC1.

The data analysis center 110 analyzes data transmitted from a plurality of vehicles VC1, VC2, . . . . The data analysis center 110 comprises a CPU 112, a ROM 114, an electrically rewritable nonvolatile memory (memory 116), a peripheral circuit 118, and communication equipment 117, and the units are communicable through a local network 119. The ROM 114 stores the learning program 74b, and the memory 116 stores the relationship definition data DR.

Figure 7:
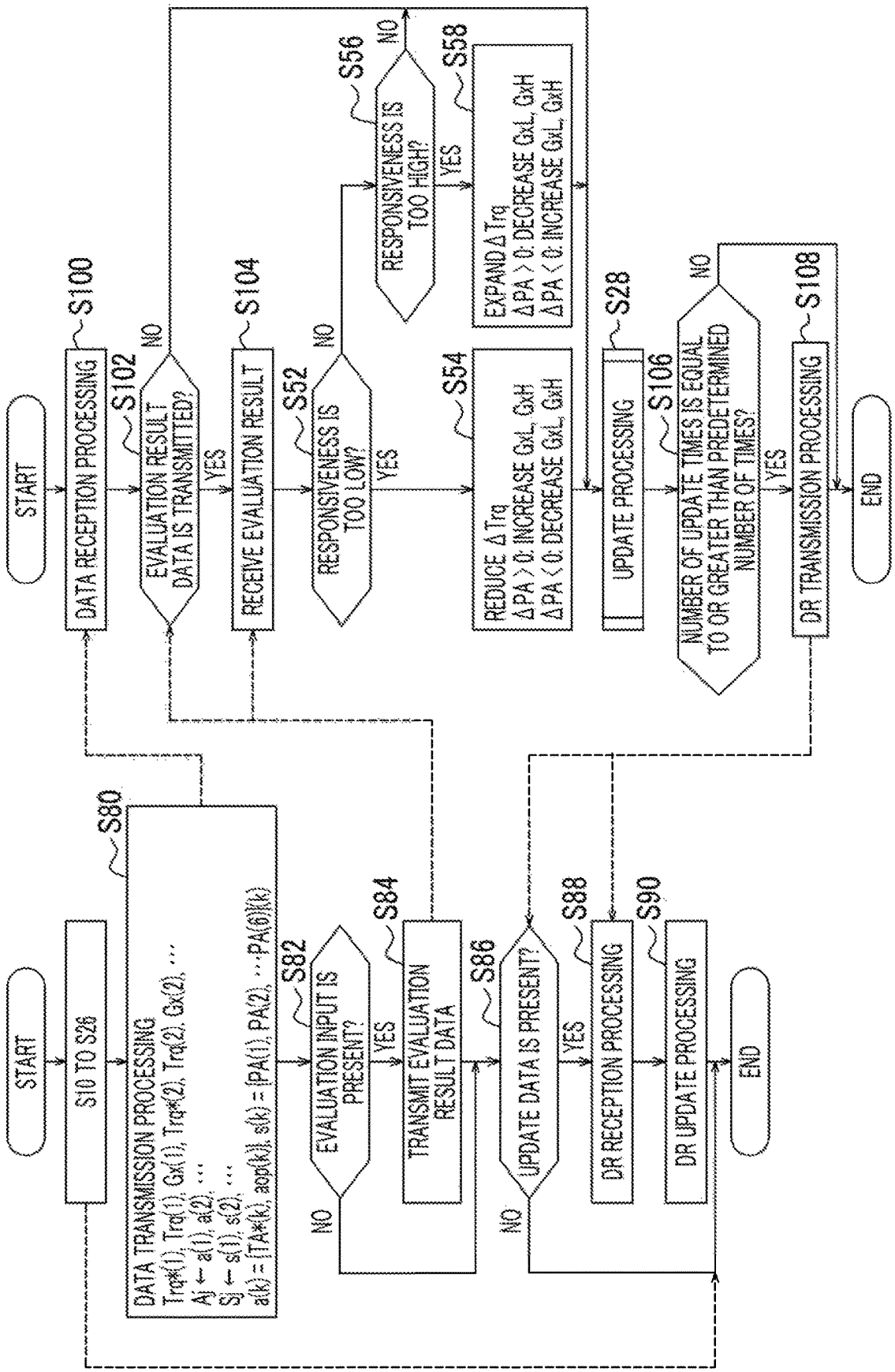
FIG. 7 is a flowchart showing a procedure of processing that is executed by the control system.

FIG. 7 shows a processing procedure of reinforcement learning according to the embodiment. Processing shown in a flow on the left side of FIG. 7 is implemented by the CPU 72 executing the control program 74a stored in the ROM 74 shown in FIG. 6. Processing shown in a flow on the right side of FIG. 7 is implemented by the CPU 112 executing the learning program 74b stored in the ROM 114. In FIG. 7, processing corresponding to the processing shown in FIGS. 3 and 4 is represented by the same step numbers for convenience. In the following description, the processing shown in FIG. 7 will be described in time series of reinforcement learning.

In a series of processing shown in the flow on the left side of FIG. 7, the CPU 72 executes the processing of S10 to S26. Then, when the processing of S22 or S26 is completed, the CPU 72 operates the communication equipment 77 to transmit data needed for learning processing (S80). Here, data to be transmitted includes the time-series data of the torque command value Trq*, the torque Trq, and the acceleration Gx, the state set Sj, and the action set Aj in an episode ended immediately before the execution of the processing of S22 or S26. The CPU 72 determines whether or not an evaluation input resulting from the operation of the evaluation switch 94 is present (S82), and when determination is made that the input is present (S82: YES), the CPU 72 operates the communication equipment 77 to transmit data relating to the evaluation result (S84).

In contrast, as shown in the flow on the right side of FIG. 7, the CPU 112 receives data transmitted through the processing of S80 (S100), and determines whether or not evaluation result data is transmitted through the processing of S84 (S102). Then, when determination is made that the evaluation result data is transmitted (S102: YES), the CPU 112 receives the evaluation result (S104), and executes the processing of S52 to S58.

When the processing of S54 or S58 is completed or when negative determination is made in the processing of S56 or S102, the CPU 112 updates the relationship definition data DR based on data received through the processing of S100 (S28). Then, the CPU 112 determines whether or not the number of update times of the relationship definition data DR is equal to or greater than a predetermined number of times (S106), and when determination is made that the number of update times of the relationship definition data DR is equal to or greater than a predetermined number of times (S106: YES), operates the communication equipment 117 to transmit the relationship definition data DR to the vehicle VC1 that transmits data received through the processing of S100 (S108). When the processing of S108 is completed or when negative determination is made in the processing of S106, the CPU 112 ends a series of processing shown in the flow on the right side of FIG. 7 once.

In contrast, as shown in the flow on the left side of FIG. 7, the CPU 72 determines whether or not update data is present (S86), and when determination is made that the update data is present (S86: YES), receives updated relationship definition data DR (S88). Then, the CPU 72 rewrites the relationship definition data DR stored in the memory 76 with the received relationship definition data DR (S90). When the processing of S90 is completed or when negative determination is made in the processing of S20, S24, or S86, the CPU 72 ends a series of processing shown in the flow on the left side of FIG. 7 once.

In this way, according to the embodiment, since the update processing of the relationship definition data DR is executed outside the vehicle VC1, it is possible to reduce a calculation load of the control device 70.

A processor is an example of the CPU 72 and the ROM 74, and a memory is an example of the memory 76. Acquisition processing is an example of the processing of S10, S16, S50, S60, or S66, and operation processing is an example of the processing of S14. Reward calculation processing is an example of the processing of S32 to S36, and update processing is an example of the processing of S38 to S44. A criterion of an acceleration is an example of the range defined by the lower limit value GxL and the upper limit value GxH. A variable relating to an opening degree of a throttle valve is an example of the throttle valve opening degree command value TA*. A first processor is an example of the CPU 72 and the ROM 74, and a second processor is an example of the CPU 112 and the ROM 114.

OTHER EMBODIMENTS

The embodiment can be modified as follows. The embodiment and the following modification examples can be combined as long as no technical contradiction arises.

Driving Preference Information

In the above-described embodiments, although a user's evaluation of the behavior of the vehicle is acquired by the operation of the evaluation switch 94, the disclosure is not limited thereto. For example, the vehicle VC1 may be provided with a microphone, and when the user says "slow" during acceleration or the like, information to the effect that a feeling of acceleration is evaluated to be low may be acquired.

In FIG. 5, although the three kinds of information of the maximum value of the accelerator operation amount PA, the maximum value of the acceleration Gx, and the analysis result of the face image data are used as the driving preference information, the disclosure is not limited thereto. Solely two or solely one among the three kinds of information may be used. A minimum value of the acceleration Gx may be used. With this, the magnitude of an absolute value of the acceleration Gx at the time of deceleration can be used as the driving preference information.

Action Variable

In the above-described embodiments, although the throttle valve opening degree command value TA* is exemplified as the variable relating to the opening degree of the throttle valve as the action variable, the disclosure is not limited thereto. For example, the responsiveness of the throttle valve opening degree command value TA* to the accelerator operation amount PA may be expressed by a wasteful time and a second-order lag filter, and three variables in total including the wasteful time and two variables defining the second-order lag filter may be used as the variable relating to the opening degree of the throttle valve. In this case, it is desirable that a state variable is a change amount per unit time of the accelerator operation amount PA instead of the time-series data of the accelerator operation amount PA.

In the above-described embodiments, although the retardation amount aop is exemplified as the variable relating to the ignition timing as the action variable, the disclosure is not limited thereto. For example, the ignition timing itself to be corrected through the KCS may be used.

In the above-described embodiments, although the variable relating to the opening degree of the throttle valve and the variable relating to the ignition timing are exemplified as the action variable, the disclosure is not limited thereto. For example, a fuel injection amount may be used in addition to the variable relating to the opening degree of the throttle valve and the variable relating to the ignition timing. In regards to the three values, solely the variable relating to the opening degree of the throttle valve and the fuel injection amount may be employed as the action variable, or solely the variable relating to the ignition timing and the fuel injection amount may be employed. In regards to the three values, solely one value may be employed as the action variable.

As described in a column "Internal Combustion Engine", in a compression ignition type internal combustion engine, a variable relating to an injection amount may be used instead of the variable relating to the opening degree of the throttle valve, and a variable relating to an injection timing may be used instead of the variable relating to the ignition timing. It is desirable that a variable relating to the number of injections in one combustion cycle or a variable relating to a time interval between an end timing of one of two adjacent fuel injections in time series and a start timing of the other fuel injection for one cylinder in one combustion cycle are added in addition to the variable relating to the injection timing.

For example, when the transmission 50 is a stepped transmission, a current value or the like of a solenoid valve that adjusts an engagement state of a clutch by hydraulic pressure may be used as an action variable. For example, as described in the column "Vehicle", when a hybrid vehicle, an electric vehicle, or a fuel cell vehicle is employed as a vehicle, torque or an output of a rotating electric machine may be used as an action variable. For example, when an in-vehicle air-conditioning device including a compressor that rotates with rotational power of a crankshaft of an internal combustion engine is provided, load torque of the compressor may be included in the action variable. When an electric in-vehicle air-conditioning device is provided, the power consumption of the air-conditioning device may be included in the action variable.

State

In the above-described embodiments, although the time-series data of the accelerator operation amount PA is data including the six values sampled at regular intervals, the disclosure is not limited thereto. Data including two or more sampling values at different sampling timings should be used, and in this case, it is more desirable that data including three or more sampling values or data with the regular sampling interval is used.

A state variable relating to the accelerator operation amount is not limited to the time-series data of the accelerator operation amount PA, and for example, as described in the column "Action Variable", the change amount per unit time of the accelerator operation amount PA, or the like may be used.

For example, as described in the column "Action Variable", when the current value of the solenoid valve is the action variable, a rotation speed of the input shaft 52 or a rotation speed of the output shaft 54 of the transmission, and hydraulic pressure that is adjusted by the solenoid valve may be included in the state. Alternatively, for example, as described in the column "Action Variable", when the torque or the output of the rotating electric machine is the action variable, a charging rate or a temperature of the battery may be included in the state. For example, as described in the column "Action Variable", when the load torque of the compressor or the power consumption of the air-conditioning device is included in the action, a temperature in the vehicle cabin may be included in the state.

Dimension Reduction of Data of Table Format

A dimension reduction method of data in a table format is not limited to that illustrated in the above-described embodiments. For example, since the accelerator operation amount PA rarely becomes a maximum value, the action value function Q is not defined on a state for which the accelerator operation amount PA becomes equal to or greater than a specified amount, and the throttle valve opening degree command value TA* and the like when the accelerator operation amount PA becomes equal to or greater than the specified amount may be separately adapted. For example, dimension reduction may be performed by excluding a value with the throttle valve opening degree command value TA* equal to or greater than a specified value from the possible values of the action.

Of course, dimension reduction is not indispensable. For example, when reinforcement learning based on data from a plurality of vehicles is performed in the third embodiment and the calculation ability of the CPU 72 or the storage capacity of the memory 76 is sufficient, while the action value function is learned on solely a part subjected to dimension reduction before shipment of the vehicle, all actions may be executable by exploration after shipment. With this, in view of the consideration that sufficient data for learning can be secured after shipment compared to before shipment, the number of possible actions as exploration increases, whereby a more appropriate action can be found.

Relationship Definition Data

In the above-described embodiments, although the action value function Q is a function in a table format, the disclosure is not limited thereto. For example, a function approximator may be used.

For example, the policy λ may be expressed by a function approximator with the state s and the action a as independent variables and the probability of taking the action a as a dependent variable instead of using the action value function Q, and parameters that determine the function approximator may be updated according to the reward r.

Operation Processing

For example, as described in the column "Relationship Definition Data", when the action value function is the function approximator, the action a maximizing the action value function Q should be selected by inputting all sets of discrete values on the action to be the independent variable of the function in a table format in the above-described embodiment to the action value function Q along with the state s.

For example, as described in the column "Relationship Definition Data", when the policy π is the function approximator having the state s and the action a as the independent variables and the probability of taking the action a as the dependent variable, the action a should be selected based on the probability indicated by the policy π.

Update Mapping

In the processing of S38 to S44, although a case where the ε-soft on-policy type Monte Carlo method is used is exemplified, the disclosure is not limited thereto. For example, an off-policy Monte Carlo method may be used. Of course, the disclosure is not limited to the Monte Carlo method, for example, an off-policy type TD method may be used, an on-policy type TD method, such as a SARSA method may be used, or eligibility trace method may be used as on-policy type learning.

For example, as described in the column "Relationship Definition Data", when the policy π is expressed using the function approximator, and the policy π is updated directly based on the reward r, update mapping may be configured using a policy gradient method or the like.

A target to be directly updated based on the reward r is not limited to any one of the action value function Q and the policy π. For example, like an actor-critic method, the action value function Q and the policy π may be updated. In the actor-critic method, the target to be updated is not limited thereto, and for example, a value function V may be a target to be updated instead of the action value function Q.

"ε" that determines the policy π is not limited to a fixed value, and may be changed according to a rule determined in advance according to a degree of progress of learning.

Reward Calculation Processing

In the processing of FIG. 3, although the reward is provided according to whether or not the logical product of the condition (i) and the condition (ii) is true, the disclosure is not limited thereto. For example, processing of providing a reward according to whether or not the condition (i) is satisfied and processing of providing a reward according to whether or not the condition (ii) is satisfied may be executed. For example, in regards to the two kinds of processing of the processing of providing the reward according to whether or not the condition (i) is satisfied and the processing of providing the reward according to whether or not the condition (ii) is satisfied, solely any one kind processing may be executed.

For example, instead of providing the same reward uniformly when the condition (i) is satisfied, processing of providing a greater reward when the absolute value of the difference between the torque Trq and the torque command value Trq* is small than when the absolute value is large may be applied. For example, instead of providing the same reward uniformly when the condition (i) is not satisfied, processing of providing a smaller reward when the absolute value of the difference between the torque Trq and the torque command value Trq* is large than when the absolute value is small may be applied.

For example, instead of providing the same reward uniformly when the condition (ii) is satisfied, processing of making the magnitude of the reward variable according to the magnitude of the acceleration Gx may be applied. For example, instead of providing the same reward uniformly when the condition (ii) is not satisfied, processing of making the magnitude of the reward variable according to the magnitude of the acceleration Gx may be applied.

For example, as described in the column "Action Variable", when the current value of the solenoid valve of the transmission 50 is the action variable, for example, at least one of the following three kinds of processing (a) to (c) may be included in the reward calculation processing.

(a) Processing of providing a greater reward when a time needed for switching a gear ratio in the transmission is within a predetermined time than when the time exceeds the predetermined time (b) Processing of providing a greater reward when an absolute value of a change rate of the rotation speed of the input shaft 52 of the transmission is equal to or less than an input-side predetermined value than when the absolute value exceeds the input-side predetermined value (c) Processing of providing a greater reward when an absolute value of a change rate of the rotation speed of the output shaft 54 of the transmission is equal to or less than an output-side predetermined value than when the absolute value exceeds the output-side predetermined value In such a case, for example, when an evaluation to the effect that the responsiveness is too low is input by the operation of the evaluation switch 94, the predetermined time should be set to be shorter, and the input-side predetermined value or the output-side predetermined value should be set to a greater value.

For example, as described in the column "Action Variable", when the torque or the output of the rotating electric machine is the action variable, processing of providing a greater reward when the charging rate of the battery is within a predetermined range than when the charging rate of the battery is out of the predetermined range or processing of providing a greater reward when the temperature of the battery is within a predetermined range than when the temperature of the battery is out of the predetermined range may be included. In this case, although solely the condition (ii) or the like may be changed depending on the driving preference information, a predetermined range may be made variable according to the driving preference information such that the condition (ii) or the like is easily satisfied in the transition operation.

For example, as described in the column "Action Variable", when the load torque of the compressor or the power consumption of the air-conditioning device is included in the action variable, processing of providing a greater reward when the temperature in the vehicle cabin is within a predetermined range than when the temperature in the vehicle cabin is out of the predetermined range may be added. In this case, although solely the condition (ii) or the like may be changed depending on the driving preference information, a predetermined range may be made variable according to the driving preference information such that the condition (ii) or the like is easily satisfied in the transition operation.

Acquisition Processing

In the above-described embodiments, although the user's evaluation result of the traveling performance is acquired by acquiring the evaluation variable VV based on an output signal of the evaluation switch 94, the disclosure is not limited thereto. For example, a device configured to sense a voice instruction may be provided instead of the evaluation switch 94, and a sensing result of the device may be acquired as the evaluation variable VV.

Vehicle Control System

In the example shown in FIG. 7, although the processing (the processing of S12) of deciding the action based on the policy π is executed on the vehicle side, the disclosure is not limited thereto. For example, data acquired through the processing of S10 may be transmitted from the vehicle VC1, and the data analysis center 110 may decide the action a using the transmitted data and may transmit the decided action to the vehicle VC1.

The vehicle control system is not limited to the vehicle control system constituted of the control device 70 and the data analysis center 110. For example, a portable terminal of the user may be used instead of the data analysis center 110. The vehicle control system may be constituted of the control device 70, the data analysis center 110, and the portable terminal. This can be implemented by the portable terminal executing, for example, the processing of S12.

Processor

The processor is not limited to the processor that includes the CPU 72 (112) and the ROM 74 (114), and executes software processing. For example, a dedicated hardware circuit, such as an ASIC, in which at least a part of the processing executed by the software in the above-described embodiments is executed by hardware, may be provided. That is, the processor should have a configuration of any one of (a) to (c) described below.

(a) A processing device that executes the entire processing in compliance with a program, and a program storage device that stores the program, such as a ROM, are provided.

(b) A processing device that executes a part of the processing in compliance with a program, a program storage device, and a dedicated hardware circuit that executes the remaining processing are provided.

(c) A dedicated hardware circuit that executes the entire processing is provided. Here, a plurality of software processors including the processing device and the program storage device or a plurality of dedicated hardware circuits may be provided.

Memory

In the above-described embodiments, although the memory that stores the relationship definition data DR and the memory (ROM 74, 114) that stores the learning program 74b or the control program 74a are separate memories, the disclosure is not limited thereto.

Internal Combustion Engine

The internal combustion engine is not limited to an internal combustion engine including a port injection valve configured to inject fuel to the intake passage 12 as the fuel injection valve, and may be an internal combustion engine including an in-cylinder injection valve configured to inject fuel directly to the combustion chamber 24 or may be, for example, an internal combustion engine including both of a port injection valve and an in-cylinder injection valve.

The internal combustion engine is not limited to a spark ignition type internal combustion engine, and may be, for example, a compression ignition type internal combustion engine or the like using diesel oil or the like as fuel.

Vehicle

The vehicle is not limited to a vehicle in which a thrust generation device is solely an internal combustion engine, and may be, for example, a so-called hybrid vehicle that includes an internal combustion engine and a rotating electric machine. For example, the vehicle may be a so-called electric vehicle or a fuel cell vehicle that does not include an internal combustion engine and includes a rotating electric machine as a thrust generation device.

What is claimed is:

1. A vehicle control device comprising
a memory configured to store relationship definition data that defines a relationship between a state of a vehicle and an action variable, which is a variable relating to an operation of electronic equipment in the vehicle, and
a processor configured to:
execute acquisition processing of acquiring a detection value of a sensor and driving preference information, which is information relating to a driving preference of a user, the sensor being configured to detect the state of the vehicle;
execute operation processing of operating the electronic equipment based on a value of the action variable determined by the detection value acquired through the acquisition processing and the relationship definition data;
execute reward calculation processing of providing, based on the detection value acquired through the acquisition processing, a greater reward when a characteristic of the vehicle satisfies a criterion than when the characteristic of the vehicle does not satisfy the criterion, the reward calculation processing being processing of providing a different reward when the driving preference information is different even though a characteristic relating to a behavior of the vehicle satisfies the same criterion;
execute update processing of updating the relationship definition data with the state of the vehicle based on the detection value acquired through the acquisition processing, the value of the action variable used for the operation of the electronic equipment, and the reward corresponding to the operation as inputs to update mapping determined in advance; and
based on the update mapping, output the relationship definition data updated to increase an expected return on the reward when the electronic equipment is operated in compliance with the relationship definition data.

2. The vehicle control device according to claim 1, wherein:
the acquisition processing includes processing of acquiring a user's evaluation of the behavior of the vehicle as the driving preference information; and
the reward calculation processing includes processing of providing a reward different from a reward before the acquisition of the evaluation when the driving preference information indicating that the evaluation is low is acquired through the acquisition processing even though the characteristic relating to the behavior of the vehicle is the same.

3. The vehicle control device according to claim 1, wherein the driving preference information includes history information of an acceleration in a front-rear direction of the vehicle.

4. The vehicle control device according to claim 1, wherein the driving preference information includes history information of an accelerator operation amount.

5. The vehicle control device according to claim 1, wherein the acquisition processing includes processing of acquiring an analysis result of a face image of the user as the driving preference information.

6. The vehicle control device according to claim 1, wherein:
the state of the vehicle includes a change in accelerator operation amount; and
the reward calculation processing includes processing of providing a greater reward when an acceleration in a front-rear direction of the vehicle accompanied by the change in accelerator operation amount satisfies a criterion than when the acceleration does not satisfy the criterion.

7. The vehicle control device according to claim 6, wherein:
the vehicle includes an internal combustion engine as a thrust generation device of the vehicle;
a throttle valve of the internal combustion engine is included in the electronic equipment; and
a variable relating to an opening degree of the throttle valve is included in the action variable.

8. A vehicle control system comprising:
a memory configured to store relationship definition data that defines a relationship between a state of a vehicle and an action variable, which is a variable relating to an operation of electronic equipment in the vehicle; and
a processor including a first processor mounted in the vehicle and a second processor different from an in-vehicle device, wherein
the first processor is configured to execute at least acquisition processing and operation processing,
the acquisition processing is processing of acquiring a detection value of a sensor and driving preference information, which is information relating to a driving preference of a user, the sensor is configured to detect the state of the vehicle,
the operation processing is processing of operating the electronic equipment based on a value of the action variable determined by the detection value acquired through the acquisition processing and the relationship definition data,
the second processor is configured to execute at least update processing, and
the update processing is processing of updating the relationship definition data with the state of the vehicle based on the detection value acquired through the acquisition processing, the value of the action variable used for the operation of the electronic equipment, and a reward corresponding to the operation as inputs to update mapping determined in advance.

9. The vehicle control system according to claim 8, wherein:
the first processor is configured to execute reward calculation processing of providing, based on the detection value acquired through the acquisition processing, a greater reward when a characteristic of the vehicle satisfies a criterion than when the characteristic of the vehicle does not satisfy the criterion;
the reward calculation processing is processing of providing a different reward when the driving preference information is different even though a characteristic relating to a behavior of the vehicle satisfies the same criterion; and
the second processor is configured to, based on the update mapping, output the relationship definition data updated to increase an expected return on the reward when the electronic equipment is operated in compliance with the relationship definition data.

10. The vehicle control system according to claim 9, wherein:
the acquisition processing includes processing of acquiring a user's evaluation of a behavior of the vehicle as the driving preference information; and
the reward calculation processing includes processing of providing a reward different from a reward before the acquisition of the evaluation when the driving preference information indicating that the evaluation is low is acquired through the acquisition processing even though the characteristic relating to the behavior of the vehicle is the same.

11. The vehicle control system according to claim 8, wherein the driving preference information includes history information of an acceleration in a front-rear direction of the vehicle.

12. The vehicle control system according to claim 8, wherein the driving preference information includes history information of an accelerator operation amount.

13. The vehicle control system according to claim 8, wherein the acquisition processing includes processing of acquiring an analysis of a face image of the user as the driving preference information.

14. The vehicle control system according to claim 9, wherein:
the state of the vehicle includes a change in accelerator operation amount; and
the reward calculation processing includes processing of providing a greater reward when an acceleration in a front-rear direction of the vehicle accompanied by the change in accelerator operation amount satisfies a criterion than when the acceleration does not satisfy the criterion.

15. The vehicle control system according to claim 14, wherein:
the vehicle includes an internal combustion engine as a thrust generation device of the vehicle;
a throttle valve of the internal combustion engine is included in the electronic equipment; and
a variable relating to an opening degree of the throttle valve is included in the action variable.

16. A method for controlling a vehicle that includes a memory and a processor, the memory being configured to store relationship definition data that defines a relationship between a state of a vehicle and an action variable, which is a variable relating to an operation of electronic equipment in the vehicle, the method comprising:
executing, by the processor, acquisition processing of acquiring a detection value of a sensor and driving preference information, which is information relating to a driving preference of a user, the sensor being configured to detect the state of the vehicle;
executing, by the processor, operation processing of operating the electronic equipment based on a value of the action variable determined by the detection value acquired through the acquisition processing and the relationship definition data;
executing, by the processor, reward calculation processing of providing, based on the detection value acquired through the acquisition processing, a greater reward when a characteristic of the vehicle satisfies a criterion than when the characteristic of the vehicle does not satisfy the criterion, the reward calculation processing being processing of providing a different reward when the driving preference information is different even though a characteristic relating to a behavior of the vehicle satisfies the same criterion;

executing, by the processor, update processing of updating the relationship definition data with the state of the vehicle based on the detection value acquired through the acquisition processing, the value of the action variable used for the operation of the electronic equipment, and the reward corresponding to the operation as inputs to update mapping determined in advance; and outputting, by the processor, based on the update mapping, the relationship definition data updated to increase an expected return on the reward when the electronic equipment is operated in compliance with the relationship definition data.

17. The method according to claim 16, wherein:

the acquisition processing includes processing of acquiring a user's evaluation of the behavior of the vehicle as the driving preference information; and the reward calculation processing includes processing of providing a reward different from a reward before the acquisition of the evaluation when the driving preference information indicating that the evaluation is low is acquired through the acquisition processing even though the characteristic relating to the behavior of the vehicle is the same.

18. The method according to claim 16, wherein the driving preference information includes history information of an acceleration in a front-rear direction of the vehicle.

19. The method according to claim 16, wherein the driving preference information includes history information of an accelerator operation amount.

20. The method according to claim 16, wherein the acquisition processing includes processing of acquiring an analysis result of a face image of the user as the driving preference information.

* * * * *